(12) United States Patent
Ennis et al.

(10) Patent No.: US 11,607,848 B2
(45) Date of Patent: Mar. 21, 2023

(54) INDICATING MATERIALS WITHIN MATERIAL CARTRIDGES

(71) Applicant: HEWLETT-PACKARD DEVELOPMENT COMPANY, L.P., Houston, TX (US)

(72) Inventors: John Ennis, Corvallis, OR (US); Jeremy Barribeau, Vancouver, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 1215 days.

(21) Appl. No.: 16/075,486

(22) PCT Filed: Jul. 21, 2017

(86) PCT No.: PCT/US2017/043287
§ 371 (c)(1),
(2) Date: Aug. 3, 2018

(87) PCT Pub. No.: WO2019/017965
PCT Pub. Date: Jan. 24, 2019

(65) Prior Publication Data
US 2021/0206076 A1    Jul. 8, 2021

(51) Int. Cl.
*B29C 64/255* (2017.01)
*B33Y 40/00* (2020.01)
(Continued)

(52) U.S. Cl.
CPC .......... *B29C 64/255* (2017.08); *B29C 64/343* (2017.08); *B33Y 40/00* (2014.12); *B33Y 30/00* (2014.12)

(58) Field of Classification Search
CPC ........ B33Y 30/00; B33Y 40/00; B29C 64/259
See application file for complete search history.

(56) References Cited

U.S. PATENT DOCUMENTS

| 7,028,860 B2 | 4/2006 | Behnke et al. |
| 7,809,287 B2 * | 10/2010 | Okamura ........... G03G 15/0865 399/12 |

(Continued)

FOREIGN PATENT DOCUMENTS

WO   WO-2015167494 A1 * 11/2015 ............ B41J 2/1755

OTHER PUBLICATIONS

"K-Sun Printers—Creative Safety Supply" Retrieved from: https://www.creativesafetysupply.com/Epson-printers/, Jun. 21, 2017, 5 pages.

*Primary Examiner* — Alison L Hindenlang
*Assistant Examiner* — Virak Nguon
(74) *Attorney, Agent, or Firm* — Shook, Hardy & Bacon L.L.P.

(57) ABSTRACT

A material cartridge includes a fresh label indicating material of the material cartridge includes previously unused material for fabrication of a three-dimensional (3D) object and a reclaimed indicator of the material cartridge, the reclaimed indicator indicating material subsequently contained within the material cartridge is reclaimed material from fabrication of a previous 3D object, wherein the reclaimed indicator is located underneath the fresh label such that when the material of the material cartridge is depleted, the fresh label is removable to expose the reclaimed indicator.

17 Claims, 5 Drawing Sheets

(51) Int. Cl.
*B29C 64/343* (2017.01)
*B33Y 30/00* (2015.01)

(56) References Cited

U.S. PATENT DOCUMENTS

| | | |
|---|---|---|
| 2006/0065123 A1 | 3/2006 | Evans |
| 2010/0024364 A1 | 2/2010 | Schagidow et al. |
| 2010/0279133 A1 | 11/2010 | Kamikage et al. |
| 2012/0116568 A1 | 5/2012 | Murphy et al. |
| 2014/0265049 A1 | 9/2014 | Burris et al. |
| 2014/0339120 A1 | 11/2014 | Key |
| 2016/0161431 A1 | 6/2016 | Stagg et al. |
| 2018/0370136 A1* | 12/2018 | Stadlmann ............ B29C 64/124 |
| 2020/0376765 A1* | 12/2020 | Kniola ................... F16K 3/085 |

\* cited by examiner

INDICATING MATERIALS WITHIN MATERIAL CARTRIDGES

BACKGROUND

An additive manufacturing device is used to fabricate a three-dimensional (3D) object. The additive manufacturing device fabricates the 3D object by depositing layers of material, such as build material, corresponding to slices of a computer-aided design (CAD) model that represents the 3D object. Some additive manufacturing devices are referred to as 3D printing devices because they use types of printing technology to deposit some of the manufacturing materials.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
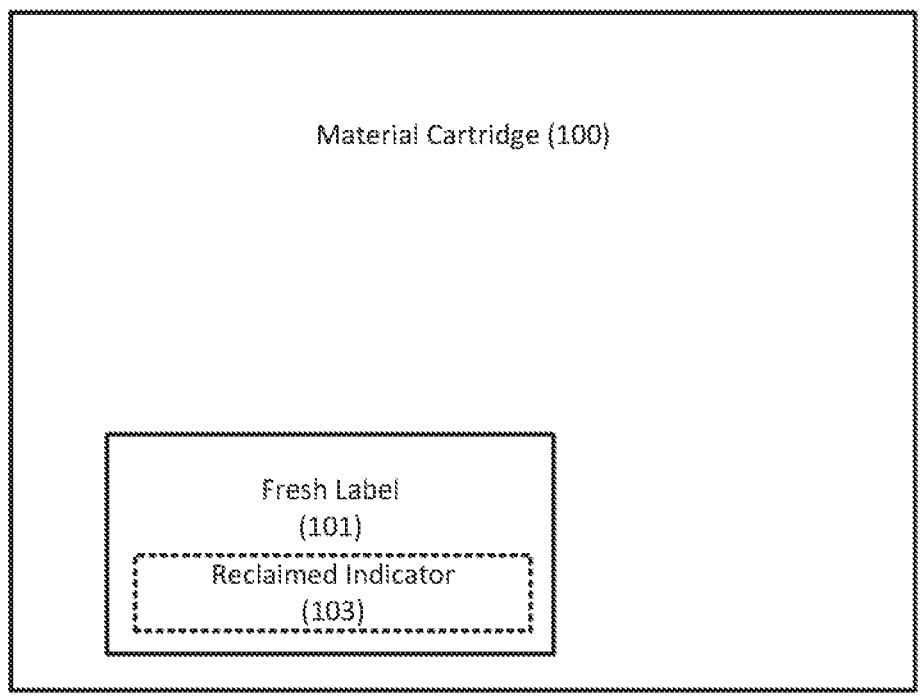
FIG. 1 is a diagram of a material cartridge, according to one example of principles described herein.

As mentioned above, an additive manufacturing apparatus fabricates a three-dimensional (3D) object from a computer-aided design (CAD) model representing the 3D object. Once the CAD model of the 3D model is created, the CAD model is processed into a number of slices. Each of the slices corresponds to a layer of the 3D object to be fabricated by the additive manufacturing device. The additive manufacturing device fabricates a portion of the 3D object by depositing a first layer of material representing the first slice of the CAD model. The additive manufacturing device then fabricates subsequent portions of the 3D object by depositing subsequent layers of the material representing subsequent slices of the CAD model on top of the first layer until the 3D object is fabricated.

The material is contained within a material cartridge. In some examples, the material cartridge, when first used, includes fresh, or previously unused, material from the manufacturer for fabrication of the 3D object. During the fabrication process, the additive manufacturing apparatus extracts the material from the material cartridge and deposits the layers of material as described above. The apparatus may use build material directly from the cartridge during fabrication or may transfer the build material from the cartridge to an internal storage and use the build material from the internal storage when operating.

During the fabrication process portions of each layer are selectively solidified, for example using thermal fusing. Solidified portions generally form part of the 3D object being generated, and non-solidified portions are removed at the end of print operation. In some cases, the non-solidified portions may be recovered for further use and are referred to herein as reclaimed material.

Some existing additive manufacturing apparatuses that reclaim and reuse materials in the process of fabrication have large, expensive, dedicated systems for storing, processing, and offloading reclaimed materials. The operators of these additive manufacturing apparatuses may be highly trained. Alternatively, aftermarket storage buckets may be manually filled with reclaimed material and then manually labeled.

The principles described herein include, for example, a material cartridge. The material cartridge includes a fresh label indicating material of the material cartridge includes previously unused material for fabrication of a 3D object and a reclaimed indicator of the material cartridge, the reclaimed indicator indicating material contained within the material cartridge is reclaimed material from fabrication of a previous 3D object. The reclaimed indicator is located underneath the fresh label such that when the material of the material cartridge is depleted, the fresh label is removable to expose the reclaimed indicator. In some cases, once a cartridge has been emptied, it may be used by the additive manufacturing apparatus to offload excess reclaimed build material back into the cartridge for storage/disposal.

The principles described herein include, for example, a system. The system includes a first slot to receive a material cartridge with a fresh label indicating material of the material cartridge includes previously unused material for fabrication of a 3D object, a sensor to detect when material contained within the material cartridge is depleted and a label remover to, in response to the sensor indicating the material contained within the material cartridge is depleted, remove the fresh label from the material cartridge to expose a reclaimed indicator of the material cartridge, the reclaimed indicator indicating material subsequently contained within the material cartridge is reclaimed material from fabrication of a previous 3D object.

The principles described herein include, for example, a system. The system includes a sensor to monitor an amount of material contained within a material cartridge located in a first slot of an additive manufacturing apparatus, where use of the material cartridge in the additive manufacturing device is a first use of the material cartridge in the additive manufacturing device since manufacture of the material cartridge, a label remover to, in response to the sensor indicating the material contained within the material cartridge is depleted, transition from an unengaged position to an engaged position such that the label remover contacts a fresh label of the material cartridge, the fresh label indicating the material of the material cartridge includes previously unused material for fabrication of a 3D object and a motor rotatably coupled to the material cartridge such that as the material cartridge rotates, the label remover removes the fresh label from the material cartridge to expose a reclaimed indicator of the material cartridge, the reclaimed indicator indicating material subsequently contained within the material cartridge is reclaimed material from fabrication of a previous 3D object.

Examples provided herein include apparatuses, processes, and methods for generating three-dimensional objects. Devices for generating three-dimensional objects may be referred to as additive manufacturing devices. As will be appreciated, example devices described herein may correspond to three-dimensional printing systems, which may also be referred to as three-dimensional printers. In an example, additive manufacturing process, a layer of build material may be formed in a build area, a fusing agent may be selectively distributed on the layer of build material, and energy may be temporarily applied to the layer of build material. As used herein, a build layer may refer to a layer of build material formed in a build area upon which agent may be distributed and/or energy may be applied.

Additional layers may be formed and the operations described above may be performed for each layer to thereby generate a 3D object. Sequentially layering and fusing portions of layers of build material on top of previous layers may facilitate generating three-dimensional objects. The layer-by-layer formation of a three-dimensional object may be referred to as a layer-wise additive manufacturing process.

In examples described herein, a build material may include a powder-based build material, where powder-based build material may include wet and/or dry powder-based materials, particulate materials, and/or granular materials. In some examples, the build material may be a weak light absorbing polymer. In some examples, the build material may be a thermoplastic or other material such as metals, or ceramics. Furthermore, as described herein, agent may include liquids that may facilitate fusing of build material when energy is applied. In some examples, agent may be referred to as coalescing or fusing agent. In some examples, agent may be a light absorbing liquid, an infrared or near infrared absorbing liquid, such as a pigment colorant. In some examples at least two types of agent may be selectively distributed on a build layer. In some examples at least one agent may inhibit fusing of build material when energy is applied.

Example apparatuses may include an agent distributor. In some examples, an agent distributor may include at least one liquid ejection device. A liquid ejection device may include at least one printhead (e.g., a thermal ejection based printhead, a piezoelectric ejection based printhead, etc.). An agent distributor may be coupled to a scanning carriage, and the scanning carriage may move along a scanning axis over the build area. In one example, printheads suitable for implementation in commercially available inkjet printing devices may be implemented as an agent distributor. In other examples, an agent distributor may include other types of liquid ejection devices that selectively eject small volumes of liquid.

In some examples, an agent distributor may include at least one liquid ejection device that includes a plurality of liquid ejection dies arranged generally end-to-end along a width of the agent distributor. In some examples, the at least one liquid ejection device may include a plurality of printheads arranged generally end-to-end along a width of the agent distributor. In such examples, a width of the agent distributor may correspond to a dimension of a build area. For example, a width of the agent distributor may correspond to a width of a build area. As will be appreciated, an agent distributor may selectively distribute agent on a build layer in the build area concurrent with movement of the scanning carriage over the build area. In some example devices, the agent distributor may include nozzles including nozzle orifices through which agent may be selectively ejected. In such examples, the agent distributor may include a nozzle surface in which a plurality of nozzle orifices may be formed.

In some examples, apparatuses may include a build material distributor to distribute build material in the build area. A build material distributor may include, for example, a wiper blade, a roller, and/or a spray mechanism. In some examples, a build material distributor may be coupled to a scanning carriage. In these examples, the build material distributor may form build material in the build area as the scanning carriage moves over the build area along the scanning axis to thereby form a build layer of build material in the build area.

FIG. 1 is a diagram of a material cartridge, according to one example of principles described herein. As shown in FIG. 1, a material cartridge (100) includes a fresh label (101) indicating material of the material cartridge comprises previously unused material for fabrication of a three-dimensional (3D) object. The cartridge (100) also has a reclaimed indicator (103) indicating material subsequently contained within the material cartridge is reclaimed material from fabrication of a previous 3D object. The reclaimed indicator (103) is located underneath the fresh label (101) such that when the material of the material cartridge is depleted, the fresh label (101) is removable to expose the reclaimed indicator (103).

Figure 1A:
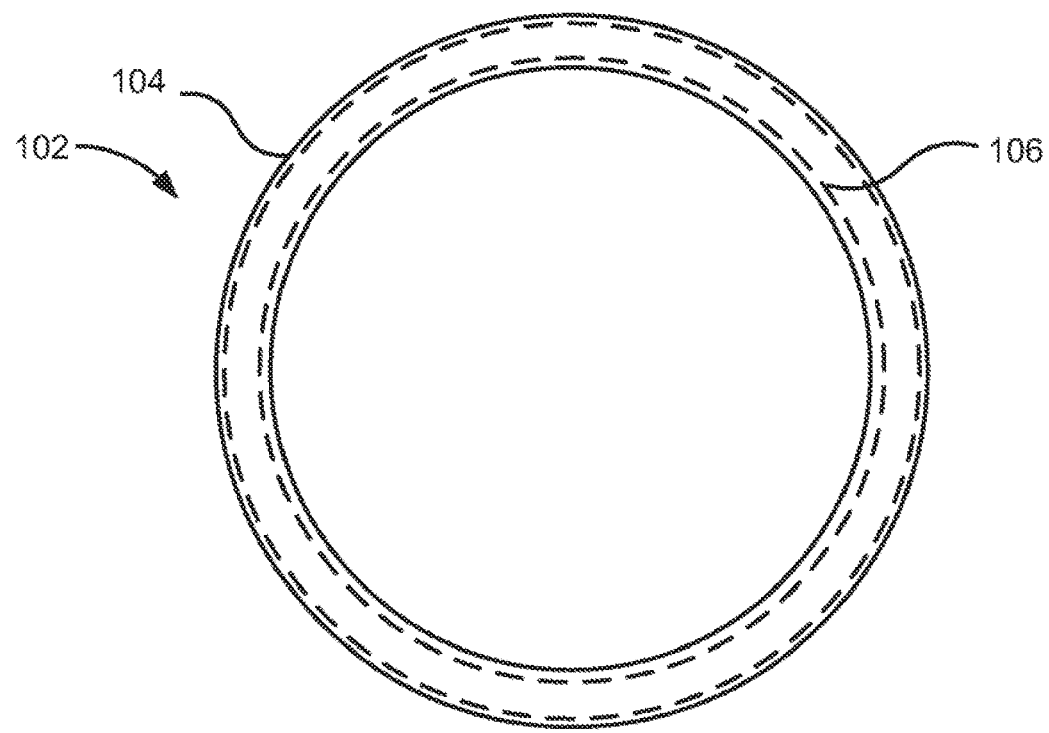
FIG. 1A is a diagram of a material cartridge, according to one example of principles described herein.

FIG. 1A is another diagram of a material cartridge, according to one example of principles described herein. As will be described below, the material cartridge (102) includes a fresh label (104) and a reclaimed indicator (106).

As illustrated, the material cartridge (102) includes a fresh label (104) indicating material of the material cartridge (102) includes previously unused material for fabrication of a 3D object. The material cartridge (102) includes a reclaimed indicator (106) of the material cartridge (102), the reclaimed indicator (106) indicating material subsequently contained within the material cartridge (102) is reclaimed material from fabrication of a previous 3D object. The reclaimed (106) indicator is located underneath the fresh label (104) such that when the material of the material cartridge (102) is depleted, the fresh label (104) is removable to expose the reclaimed indicator (106).

Figure 1B:
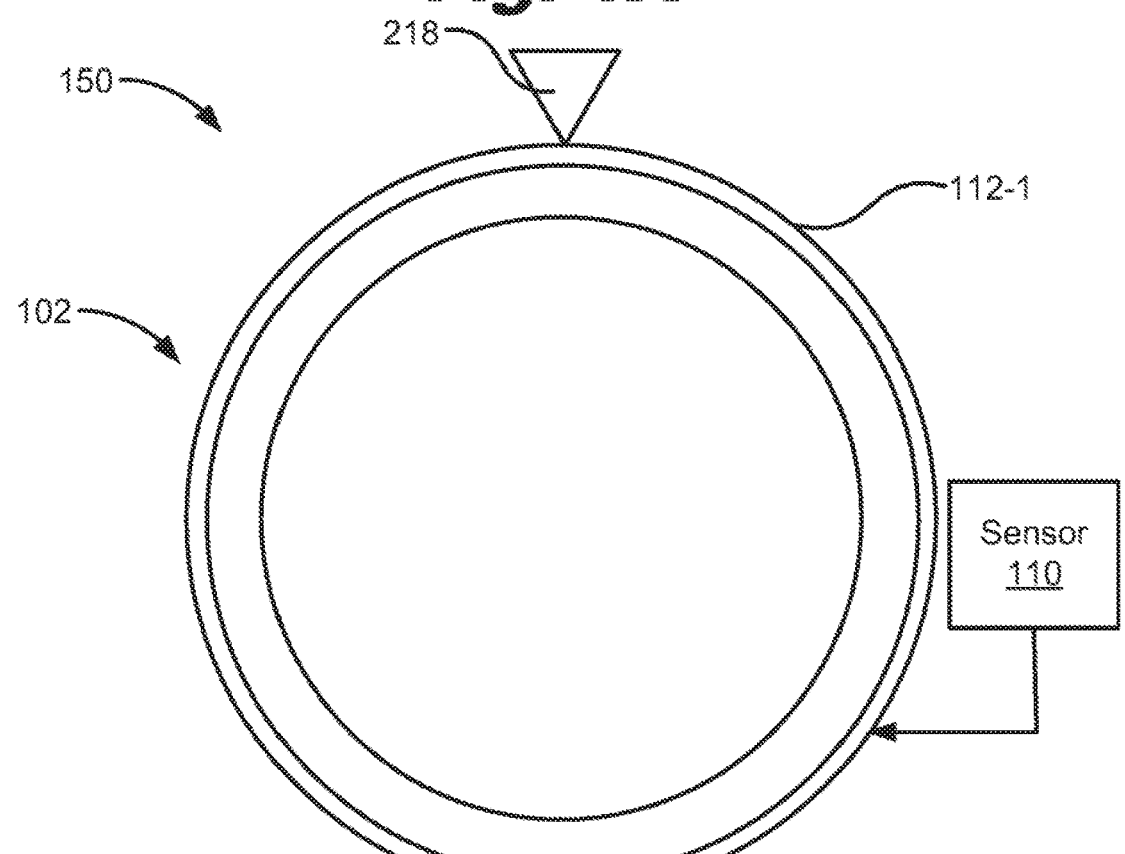
FIG. 1B is a diagram of a system for removing a fresh label from a material cartridge, according to one example of principles described herein.

FIG. 1B is a diagram of a system for removing a fresh label from a material cartridge, according to one example of principles described herein. As will be described below, the system (150) includes a first slot (112-1), a sensor (110) and a label remover (218).

As illustrated, the system (150) includes a first slot (112-1) to receive a material cartridge (102) with a fresh label (104) indicating material of the material cartridge (102) includes previously unused material for fabrication of a 3D object. The system (150) includes a sensor (110) to detect when material contained within the material cartridge (102) is depleted. The system (150) includes a label remover (218) to, in response to the sensor (110) indicating the material contained within the material cartridge (102) is depleted, remove the fresh label (104) from the material cartridge (102) to expose a reclaimed indicator (106) of the material cartridge (102), the reclaimed indicator (106) indicating material subsequently contained within the material cartridge (102) is reclaimed material from fabrication of a previous 3D object.

In any of the illustrated examples and others, once the fresh label (101) is removed to expose the reclaimed indicator, the fresh label (101) can be disposed of in a number of ways. For example, the fresh label may remain partially attached to the material cartridge so that is can be completely removed and manually discarded when a user next accesses the material cartridge. Alternatively, the label remover (218) may include a mechanism to eject the removed fresh label from the system (150) for disposal.

Figure 1C:
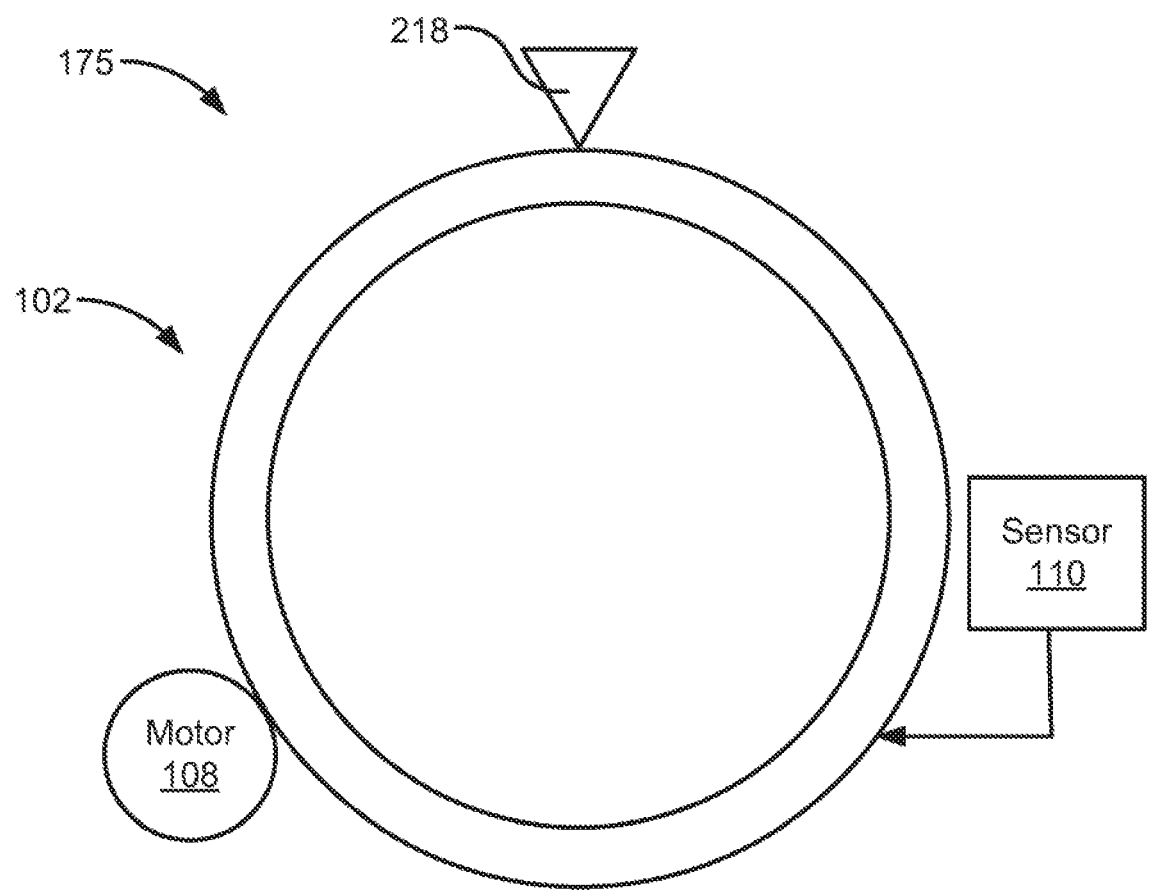
FIG. 1C is a diagram of a system for removing a fresh label from a material cartridge, according to one example of principles described herein.

FIG. 1C is a diagram of a system for removing a fresh label from a material cartridge, according to one example of principles described herein. As will be described below, the system (175) includes a sensor (110), a label remover (218) and a motor (108).

As illustrated, the system (175) includes a sensor (110) to monitor an amount of material contained within a material cartridge (102) located in a first slot (112-1) of an additive manufacturing apparatus, wherein use of the material cartridge (102) in the additive manufacturing device is a first use of the material cartridge (102) in the additive manufacturing device since manufacture of the material cartridge (102). The system (175) includes a label remover (218) to, in response to the sensor (110) indicating the material contained within the material cartridge (102) is depleted, transition from an unengaged position to an engaged position such that the label remover (218) contacts a fresh label (104) of the material cartridge (102), the fresh label (104) indicating the material of the material cartridge (102) includes previously unused material for fabrication of a 3D object. The system (175) includes a motor (108) rotatably coupled to the material cartridge (102) such that as the material cartridge (102) rotates, the label remover (218) removes the fresh label (104) from the material cartridge (102) to expose a reclaimed indicator (106) of the material cartridge (102), the reclaimed indicator (106) indicating material subsequently contained within the material cartridge (102) is reclaimed material from fabrication of a previous 3D object. In other examples, a cutter may move around a stationary cartridge to remove the fresh label and expose the reclaimed indicator. Any mechanism for removing the fresh label to expose the reclaimed indicator may be used.

Figure 2A:
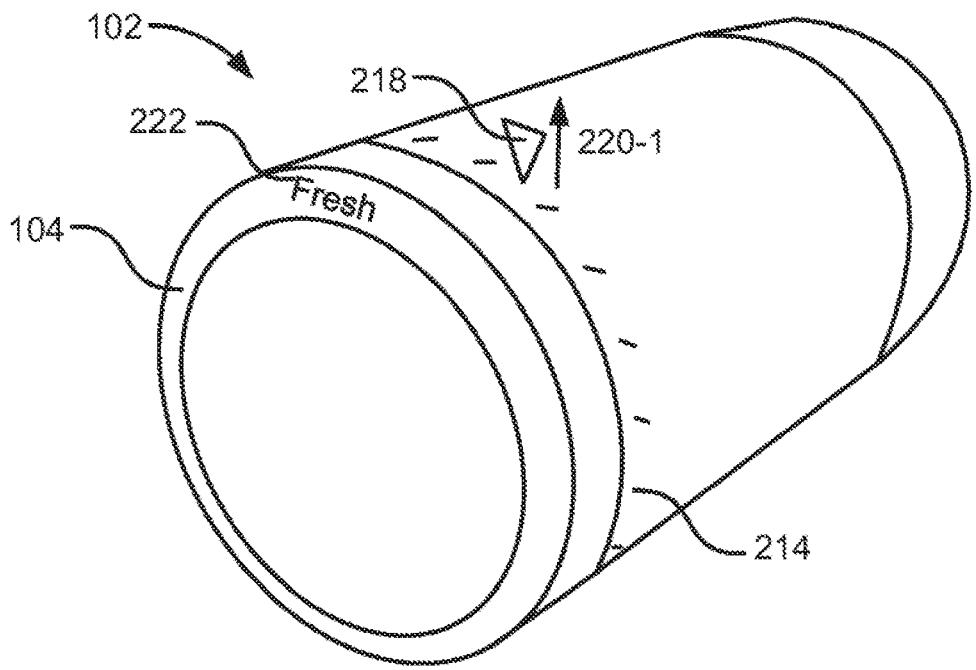
FIG. 2A is a diagram of a material cartridge with a fresh label exposed, according to one example of principles described herein.

FIG. 2A is a diagram of a material cartridge with a fresh label exposed, according to one example of principles described herein. As will be described below, a material cartridge (102) includes a fresh label (104).

The material cartridge (102) may hold or contain material to be printed by the 3D printer to form a 3D object of the material. The material may be in powder form or other form. The material may be metal, plastic, polymer, glass, ceramic, or other material. The additive manufacturing apparatus's material cartridge (102) may supply or provide for the material to the additive manufacturing apparatus (300) either directly or indirectly, e.g., via a material processing unit.

As illustrated, the material cartridge (102) includes a fresh label (104). The fresh label (104) indicates the material of the material cartridge (102) includes previously unused material for fabrication of a 3D object. In an example, the fresh label (104) is a polymer plastic film covering an exterior portion of the material cartridge (102). For example, the fresh label (104) may cover the entire material cartridge (102) or a front portion of the material cartilage (102) that is exposed when inserted into slots (112) of an additive manufacturing apparatus (300). In some examples, the polymer plastic films are commonly referred to as shrink wraps. Such polymer plastic films include polyolefin, polyvinyl chloride (PVC), polyethylene, polypropylene among other polymer plastic films. The polymer plastic films can shrink unidirectional or bidirectional to the material cartridge (102) at time of manufacture. As a result, the fresh label (104) can conform to the shape of the material cartridge (102).

In one example, the fresh label (104) is located on a front exterior portion of the material cartridge (102). As will be described below, this is an ideal location for the fresh label (104) because when the material cartridge (102) is inserted into slots (112) of the additive manufacturing apparatus (300), a user can view this portion of the material cartridge (102) without removing the material cartridge (102) to identify the type of material contained within the material cartridge (102). Further, when the material cartridge (102) is placed on, for example, a shelf for storage, this portion of the material cartridge (102) is viewable from a variety of angles such that the user can easily identify the type of material contained within the material cartridge (102).

In an example, the fresh label (104) may include perforations (214) to aid a label remover (218) in removing the fresh label (104) from the material cartridge (102). In an example, the perforations (214) are small holes in the fresh label (104) that is organized in a pattern such that the label remover (218) cuts the fresh label (104) along the path of the perforations (214) illustrated in FIG. 2A.

In an example, the fresh label (104) includes a message (222) to indicate the previously unused material is contained within the material cartridge (102). The message (222) can be text, images, or color(s), among other indicators. In the example illustrated in FIG. 2A, the message (222) is text stating the contents of the cartridge are fresh. As a result, when the user views the fresh label (104) with this message (222), the user is able to immediately determine that previously unused material is contained within the material cartridge (102).

FIG. 2A illustrates a label remover (218). The label remover (218) may be a blade, a bar, a lever or any other type of mechanism that can remove the fresh label (104) from the material cartridge (102). As mentioned above, the label remover (218) transitions between an engaged position and an unengaged position such that when the label remover (218) is in the unengaged position as illustrated by arrow 220-1, the label remover (218) does not contact the fresh label (104). In some examples, a distance the label remover (218) travels when transitioning between the engaged position and an unengaged position is between 2 to 3 millimeters. Although not illustrated, a motor or an actuator may, when instructed by a processor, transition the label remover (218) between the engaged position and an unengaged position.

Figure 2B:
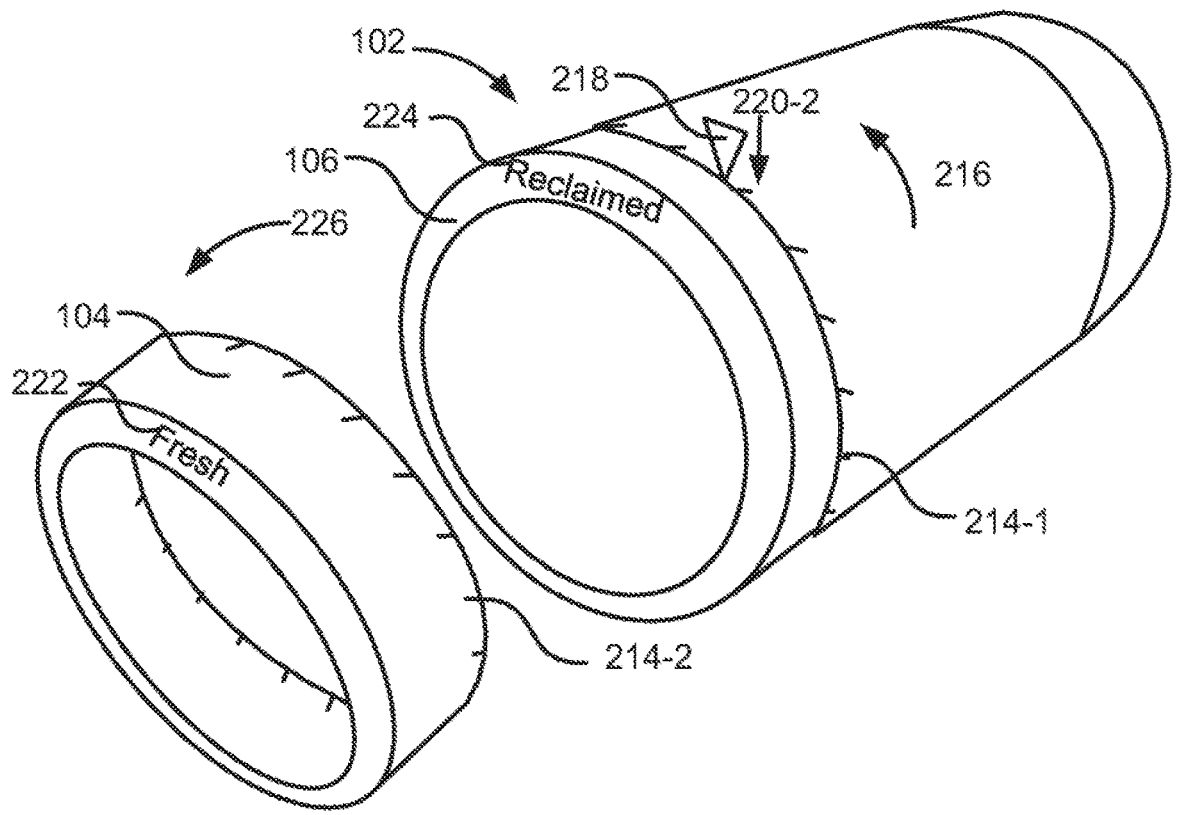
FIG. 2B is a diagram of a material cartridge with a reclaimed indicator exposed, according to one example of principles described herein.

FIG. 2B is a diagram of a material cartridge with a reclaimed indicator exposed, according to one example of principles described herein. As will be described below, a label remover (218) is used to remove a fresh label (104) from the material cartridge (102) such that a reclaimed indicator (106) is exposed.

As mentioned above, in response to the sensor (110) indicating the material contained within the material cartridge (102) is depleted, the fresh label (104) is removed from the material cartridge (102) to expose a reclaimed indicator (106) of the material cartridge (102). For example, when the sensor (110) indicates the material contained within the material cartridge (102) is depleted, the label remover (218) is transitioned to the engaged position as indicated by arrow 220-2. In the engaged position, the label remover (218) contacts the fresh label (104). The motor (108) then rotates the material cartridge (102) as indicated by arrow 216. Since the label remover (218) is in the engaged position, the label remover (218) removes the fresh label (104) aided by the perforations (214) but not the reclaimed indicator (106) from the material cartridge (102).

In an example, the reclaimed indicator (106) is located underneath the fresh label (104). As a result, when the label remover (218) removes the fresh label (104) as indicated by arrow 226, the reclaimed indicator (106) is exposed as illustrated in FIG. 28.

In an example, the reclaimed indicator (106) is a polymer plastic film. In an example, the reclaimed indicator (106) is a polymer plastic film covering a portion of the material cartridge (102). Such polymer plastic films include polyolefin, PVC, polyethylene, polypropylene among other polymer plastic films.

In another example, the reclaimed indicator (106) is molded into the material cartridge (102). For example, the reclaimed indicator (106) is made out of the same material as the material cartridge (102) and is stamped or otherwise molded into the material cartridge (102) at time of manufacture.

In one example, the reclaimed indicator (106) is located on a front portion of the material cartridge (102) underneath the fresh label (104). As will be described below, this is an ideal location for reclaimed indicator (106) because when the material cartridge (102) is inserted into slots (112) of the additive manufacturing apparatus (300), the user can view this portion of the material cartridge (102) as described above. Further, when the material cartridge (102) is placed on, for example, a shelve for storage, this portion of the material cartridge (102) is viewable from a variety of angles such that the user can easily identify the type of material contained within the material cartridge (102)

In an example, the reclaimed indicator (106) includes a message (224) to indicate reclaimed material is contained within the material cartridge (102). The message (224) can be text, images, colors among others. As illustrated in FIG. 2B, the message (222) is text such as "reclaimed" or otherwise indicating that the material in the cartridge is reclaimed. As a result, when the user views the reclaimed indicator (106) with this message (224), the user can easily determine that the material is contained within the material cartridge (102) is reclaimed material.

Figure 3A:
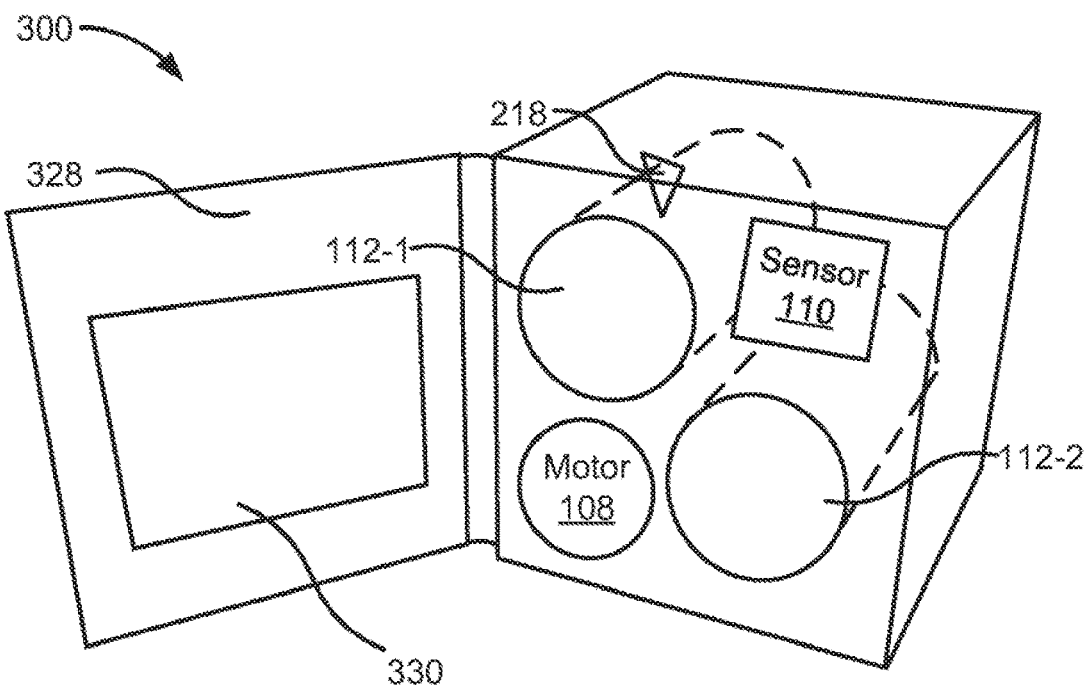
FIG. 3A is a diagram of a number of slots to house material cartridges, according to one example of principles described herein.

FIG. 3A is a diagram of a number of slots to house material cartridges, according to one example of principles described herein. As will be described below, the additive manufacturing apparatus (300) includes a number of slots (112), a sensor (110), a label remover (218) and a motor (108).

As illustrated, the additive manufacturing apparatus (300) includes a first slot (112-1) to receive a material cartridge (102) with a fresh label (104) indicating material of the material cartridge (102) includes previously unused material for fabrication of a 3D object. In an example, a material cartridge (102) with a fresh label (104) is inserted into this first slot (112-1).

The additive manufacturing apparatus (300) includes a second slot (112-2) to receive a material cartridge (102) with a reclaimed indicator (106) indicating material of the material cartridge (102) includes reclaimed material for fabrication of a 3D object. In an example, a material cartridge (102) with a reclaimed indicator (106) is inserted into this second slot (112-2).

The additive manufacturing apparatus (300) includes a sensor (110) to detect when material contained within the material cartridge (102) is depleted. In an example, the sensor (110) detects when material contained within the material cartridge (102) inserted into the first slot (112-1) is depleted. In an example, the sensor (110) detects when material contained within the material cartridge (102) inserted into the second slot (112-2) is depleted. The material cartridge (102) may be filled with a predetermined amount of material. As a result, the sensor (110) detects when the material is depleted based on an amount of material removed from the material cartridge (102) when fabricating a 3D object.

The additive manufacturing apparatus (300) includes a label remover (218). The label remover (218) removes, in response to the sensor (110) indicating the material contained within the material cartridge (110) of the first slot (112-1) is depleted, the fresh label (104) from the material cartridge (102) to expose a reclaimed indicator (106) of the material cartridge (102). For example, the label remover (218) transitions to an engaged position and the motor (108) rotatably coupled to the material cartridge (102) rotates the material cartridge (102) such that the label remover (218) removes the fresh label (104) from the material cartridge (102) as described above.

Figure 3B:
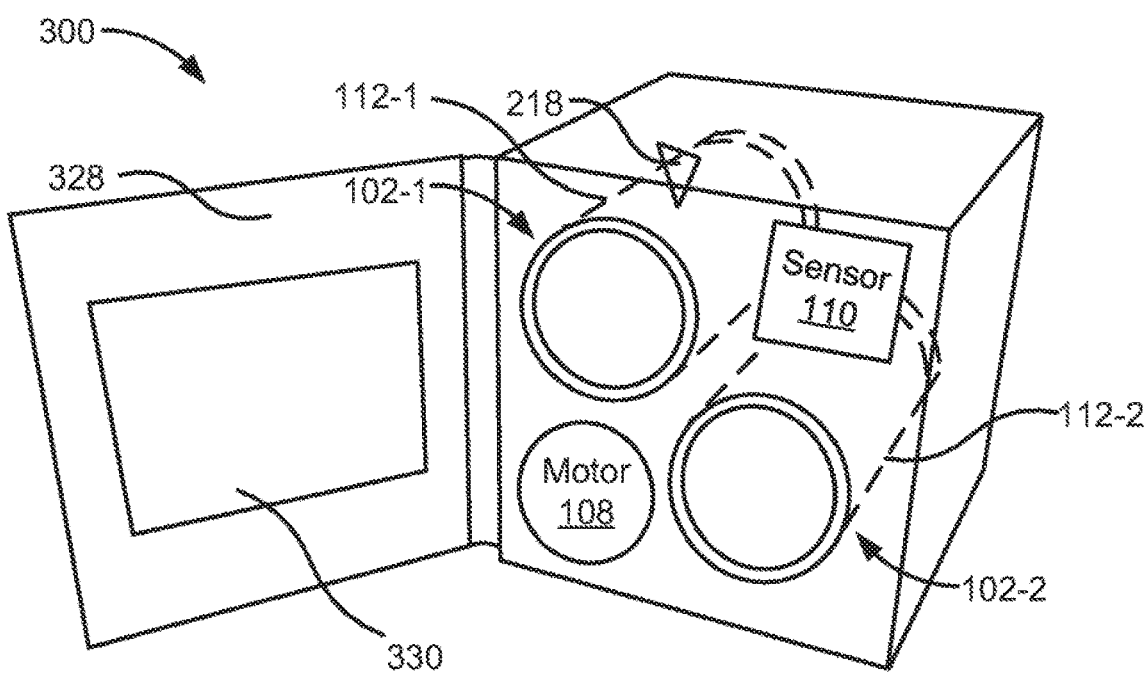
FIG. 3B is a diagram of a number of material cartridges housed in slots of an additive manufacturing apparatus, according to one example of principles described herein.

FIG. 3B is a diagram of a number of material cartridges housed in slots of an additive manufacturing apparatus, according to one example of principles described herein. As will be described below, the additive manufacturing apparatus (300) includes a number of slots (112), a sensor (110), a label remover (218) a motor (108), a door (328) and a display (330).

As mentioned above, the additive manufacturing apparatus (300) includes a second slot (112-2) to receive the material cartridge (102) with the exposed reclaimed indicator (106) such that during operation of an additive manufacturing apparatus (300), the reclaimed material contained within the material cartridge (102-2) can be used by the additive manufacturing apparatus (300) for fabrication of the 3D object.

The additive manufacturing apparatus (300) includes a display (330). The display (330) prompts a user to remove the material cartridge (102-1) located in the first cartridge slot (112-1) of the additive manufacturing apparatus (300) once the material contained within the material cartridge (102-1) is depleted. In some examples, the display (330) indicates if the material cartridge (102-1) is to be placed on a shelf for future use, discarded, or inserted in the second slot (112-2) to collect reclaimed material. For example, the display (330) prompts the user to insert a material cartridge (102-2) with the reclaimed indicator (106) into a second slot (112-2) of the additive manufacturing apparatus (300) to collect the reclaimed material produced during operation of the additive manufacturing apparatus (300).

The preceding description has been presented to illustrate and describe examples of the principles described. This description is not intended to be exhaustive or to limit these principles to any precise form disclosed. Many modifications and variations are possible in light of the above teaching.

What is claimed is:

1. A system comprising a material cartridge, the material cartridge comprising:
   a fresh label; and
   a reclaimed indicator of the material cartridge;
   wherein the reclaimed indicator is located underneath the fresh label such that when material in the material cartridge is depleted, the fresh label is removable to expose the reclaimed indicator;
   wherein the fresh label indicates that the material cartridge contains build material for an additive manufacturing system that has not been used in any previous additive manufacturing job, and the reclaimed indicator indicates that the material cartridge contains, or is to contain, reclaimed build material from a previous additive manufacturing job.

2. The system of claim 1, wherein the fresh label is a polymer plastic film covering an exterior portion of the material cartridge.

3. The system of claim 1, wherein the fresh label comprises perforations to aid a label remover in removing the fresh label from the material cartridge.

4. The system of claim 1, wherein the reclaimed indicator is a polymer plastic film.

5. The system of claim 1, wherein the reclaimed indicator is molded into the material cartridge.

6. The system of claim 1, further comprising:
a first slot to receive the material cartridge with the fresh label indicating material of the material cartridge comprises previously unused material for fabrication of a three-dimensional (3D) object;
a sensor to detect when material contained within the material cartridge is depleted; and
a label remover to, in response to the sensor indicating the material contained within the material cartridge is depleted, remove the fresh label from the material cartridge to expose the reclaimed indicator of the material cartridge, the reclaimed indicator indicating material subsequently contained within the material cartridge is reclaimed material from fabrication of a previous 3D object.

7. The system of claim 6, wherein further comprising a motor rotatably coupled to the material cartridge to, in response to the sensor indicating the material contained within the material cartridge is depleted, rotate the material cartridge such that a label remover removes the fresh label from the material cartridge.

8. The system of claim 6, further comprising a second slot to receive the material cartridge with the exposed reclaimed indicator such that during operation of an additive manufacturing apparatus, the reclaimed material contained within the material cartridge can be used by the additive manufacturing apparatus for fabrication of the 3D object.

9. The system of claim 6, wherein the label remover is moveable relative to the material cartridge, which remains stationary, to remove the fresh label.

10. The system of claim 6, wherein the fresh label is located on a front exterior portion of the material cartridge.

11. The system of claim 6, wherein the reclaimed indicator is located underneath the fresh label.

12. The system of claim 11, further comprising a display to:
prompt a user to remove the material cartridge located in the first cartridge slot of the additive manufacturing apparatus once the material contained within the material cartridge is depleted; and
prompt the user to insert the material cartridge with the reclaimed indicator into a second slot of the additive manufacturing apparatus to collect the reclaimed material produced during operation of the additive manufacturing apparatus.

13. The system of claim 1, further comprising:
a sensor to monitor an amount of material contained within the material cartridge located in a first slot of an additive manufacturing apparatus, wherein use of the material cartridge in the additive manufacturing device is a first use of the material cartridge in the additive manufacturing device since manufacture of the material cartridge;
a label remover to, in response to the sensor indicating the material contained within the material cartridge is depleted, transition from an unengaged position to an engaged position such that the label remover contacts the fresh label of the material cartridge, the fresh label indicating the material of the material cartridge comprises previously unused material for fabrication of a three-dimensional (3D) object; and
a motor rotatably coupled to the material cartridge such that as the material cartridge rotates, the label remover removes the fresh label from the material cartridge to expose the reclaimed indicator of the material cartridge, the reclaimed indicator indicating material subsequently contained within the material cartridge is reclaimed material from fabrication of a previous 3D object.

14. The system of claim 1, further comprising a display to prompt a user to remove the material cartridge from a first cartridge slot when the material in the material cartridge is depleted and indicate if the cartridge is to be discarded or inserted in a second cartridge slot to be loaded with reclaimed build material.

15. The system of claim 1, wherein the fresh label is partially attached to the material cartridge, exposing the reclaimed indicator, but remaining partially attached for later disposal.

16. A system comprising a material cartridge, the material cartridge comprising:
a fresh label; and
a reclaimed indicator of the material cartridge, the reclaimed indicator indicating that material contained within the material cartridge, or to be contained within the material cartridge, is reclaimed material from fabrication of a previous 3D object;
wherein the reclaimed indicator is located underneath the fresh label such that when material in the material cartridge is depleted, the fresh label is removable to expose the reclaimed indicator; and
wherein the fresh label is shrink-wrapped onto the material cartridge over the reclaimed indicator.

17. A system comprising:
a material cartridge, the material cartridge comprising:
a fresh label; and
a reclaimed indicator of the material cartridge, the reclaimed indicator indicating that material contained within the material cartridge, or to be contained within the material cartridge, is reclaimed material from fabrication of a previous 3D object;
wherein the reclaimed indicator is located underneath the fresh label such that when material in the material cartridge is depleted, the fresh label is removable to expose the reclaimed indicator;
a sensor to detect when material in the material cartridge is depleted; and
a label remover to remove the fresh label and expose the reclaimed indicator in response to a signal from the sensor that the material in the material cartridge is depleted.

* * * * *